US006506449B2

(12) United States Patent
Mierau et al.

(10) Patent No.: US 6,506,449 B2
(45) Date of Patent: Jan. 14, 2003

(54) METHOD FOR MANUFACTURE OF STATIC FILTRATION MEDIA

(75) Inventors: Bradley D. Mierau, Clearwater, FL (US); Henry C. Reid, Clearwater, FL (US); John E. Nohren, Jr., Clearwater, FL (US); Gerald J. Larsen, Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

(21) Appl. No.: 09/741,342

(22) Filed: Dec. 21, 2000

(65) Prior Publication Data

US 2002/0108901 A1 Aug. 15, 2002

Related U.S. Application Data

(60) Provisional application No. 60/200,014, filed on Apr. 27, 2000, and provisional application No. 60/175,965, filed on Jan. 13, 2000.

(51) Int. Cl.[7] .................................................. B05D 5/00
(52) U.S. Cl. ........................ 427/244; 427/365; 427/366; 427/371; 427/385.5; 427/395.5
(58) Field of Search ................................ 427/244, 365, 427/366, 371, 385.5, 395.5

(56) References Cited

U.S. PATENT DOCUMENTS

| 3,019,127 A | | 1/1962 | Czerwonka et al. |
| 4,571,359 A | * | 2/1986 | Dutt ........................... 428/240 |
| 4,963,431 A | | 10/1990 | Pontius |
| 5,161,686 A | | 11/1992 | Weber et al. |
| 5,674,391 A | | 10/1997 | Nohren, Jr. |
| 6,183,670 B1 | * | 2/2001 | Torobin et al. ............... 264/6 |

FOREIGN PATENT DOCUMENTS

EP                  0 402 661           12/1990

* cited by examiner

*Primary Examiner*—Bernard Pianalto
(74) *Attorney, Agent, or Firm*—Nixon & Vanderhye P.C.

(57) ABSTRACT

A simple yet effective method and apparatus produce a web suitable for treatment of water as a static filtration media, e.g. to remove chlorine and lead from water in contact with the media. A web is coated with a coating composition that facilitates treatment of water and includes a binder, and the web is compressed in one dimension about 25–75% (e.g. 40–60%) so as to make the void size distribution substantially more uniform. The compression is substantially maintained until the binder substantially cures so that the coated final web produced has a second void size distribution more uniform than the first void size distribution, e.g. the coated final web having void volumes with a mean value of about $6-7 \times 10^{-8}$ liters and/or an RDV/BV ratio of at least 0.4, and a porosity of greater than 90%. Compression may be at least primarily practiced by substantially immediately after coating passing the web through a series of staggered rollers; or by tightly winding the web prior to cure of the binder; or by compressing the web while in a curing tunnel using upper and lower compression belt roller assemblies. Coating may be practiced using a non-woven web having a weight of about 4–7 ounces/sq. ft., and by applying a coating equal to about 100–200% of the uncoated weight of the fabric comprising about 10–20% binder, about 60–90% activated carbon, and about 0–25% zeolite.

23 Claims, 3 Drawing Sheets

METHOD FOR MANUFACTURE OF STATIC FILTRATION MEDIA

CROSS-REFERENCE TO RELATED APPLICATIONS

This application is based upon provisional applications Ser. No. 60/200,014, filed Apr. 27, 2000 (13-94) and 60/175,965, filed Jan. 13, 2000 (13-77), the disclosures of which are incorporated by reference herein.

BACKGROUND AND SUMMARY OF THE INVENTION

The invention relates to a method and equipment for making the static filtration media disclosed in U.S. application Ser. No. 09/506,575 filed Feb. 18, 2000, the disclosure of which is hereby incorporated by reference herein. For example the invention is useful in the manufacture of the following preferred embodiment of the substrate from the application Ser. No. 09/506,575:

- Polyester, or other fiber, non-woven fabric about 4 to 7 ounces/sq. ft. when compressed and about 8 mm thick
- Functional Coating equal to about 100 to 200% of the uncoated fabric weight, comprised of:
    - FDA compliant vinyl acrylic binder about 10 to 20% of the coating by weight
    - Coconut shell activated carbon about 60 to 85% of the coating by weight
    - Zeolite molecular sieve about 0 to 25% of the coating by weight, preferably about 5–20%

A useful term to describe a filter medium, which can be operated in a static manner, is the ratio of "readily deliverable fluid volume" (RDV) to total bed volume (BV). Readily deliverable fluid volume is defined here as the volume of fluid, which will drain from a decanted filter bed without the application of any external force (other than gravity). Static filters typically exhibit RDV/BV ratios from 30 to 80 percent, as measured from the cessation of streaming flow.

Traditional filtration devices cannot be operated effectively in a static manner, because the extra-particle bulk volume in a packed bed is very small relative to the bed volume. The RDV/BV ratio of a granular activated carbon bed packed with 12×30-mesh carbon is typically 9 percent for a cylindrical bed around 8.5 inches in depth and 4.5 inches in diameter. The argument cannot be made that a packed bed overlaid with a column of fluid constitutes static treatment, as the mean distance between a fluid molecule and an adsorptive site is too large to allow for treatment within a reasonable amount of time. In addition, in such a system the tortuosity of the fluid path between the particles of the packed bed would hinder diffusion to the point of making the majority of the bed inaccessible to adsorption.

Compression is used to reduce the average voids which hold the water, to be approximately 6–7 (e.g. about 6.5) *$10^{-8}$ liters in volume. This equates to a RDV/BV ratio in the neighborhood of 63% for a cylindrical bed around 8.5 inches in depth and 4.5 inches in diameter, as measured from the cessation of streaming flow. Larger voids are tolerated if residence time between use is not a priority. Controlling the RDV/BV ratio rather than the minimum fill and pour rate, addresses a weakness inherent in EP 0402661.

A significant improvement in the treatment material described in EP 0402661 is obtained by a post impregnation modification of the substrate. The capacity of the media is significantly increased by narrowing the void size distribution about what is believed to be an optimum value. Fill and pour rates are determined to a large degree by the size of the largest voids in the non-woven. Capacity on the other hand is determined by smaller relative percentages of the smallest voids, since capacity is determined by the ability of the fluid to freely flow from the media and not be held by capillary forces. (Capacity in the context of this application refers to the volume the filter is able to deliver on demand, rather than amount of contaminant removal which can occur over the life of the filter). In effect what is desired is to have a medium which has a narrow size distribution of voids just large enough to maintain the rapid fill and pour rates. By employing a base material which has a void size distribution in a range where the smallest voids are excluded, compression can be used to preferentially collapse the larger voids. This yields a product with the narrowest void size distribution, centered around an optimal size value for production capacity, flow rate, and removal rate. This effectively alleviates a static-filter size restriction which exists if the fabric contains a large number of small voids, and creates an improvement in efficiency over a product which contains larger volume voids. Without this technique it becomes more difficult to fabricate a static filter which can still pour effective volumes when in a small size configuration.

The diffusion of material from inside a well mixed sphere of fluid to it's sorptive outer boundary can be modeled by $$\frac{\partial C}{\partial t} = D\left(\frac{\partial^2 C}{\partial r^2} + \frac{2}{r}\frac{\partial C}{\partial r}\right)$$

where C is the concentration within the fluid, t the time the fluid has been within the sphere, D the diffusion coefficient of the chemical dissolved in the fluid, and r the radial dimension within the sphere. A mathematical transformation facilitates the solution of this problem.

By setting $$u=Cr$$

the differential mass balance (Equation 1) becomes $$\frac{\partial u}{\partial t} = D\frac{\partial^2 u}{\partial r^2}$$

which is easily solved[1] for the ratio between the total mass of chemical which has left the sphere at a given time and the amount that would eventually be removed $$\frac{m_t}{m_\infty} = 1 - \frac{6}{\pi^2}\sum_{n=1}^{\infty}\frac{1}{n}\exp\left(\frac{-Dn^2\pi^2 t}{a^2}\right)$$

where $m_t$ is the mass removed at time t, $m_\infty$ the mass which would be removed at equilibrium, and a the radial dimension at the sphere surface.

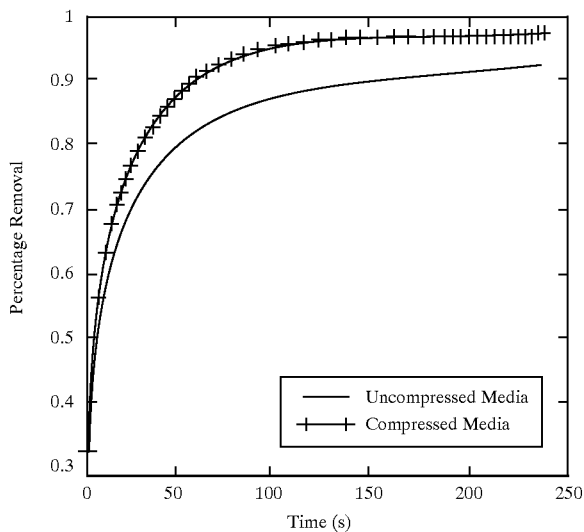

FIG. 1: The theoretical effects of compression on performance.

TABLE 1

The theoretical effects of compression on performance.

| Time (min) | Percent Contaminant Removal | |
| --- | --- | --- |
| | Uncompressed | Compressed |
| 0.0 | 30.63 | 32.86 |
| 0.5 | 70.16 | 75.97 |
| 1.0 | 78.68 | 85.26 |
| 1.5 | 83.44 | 90.08 |
| 2.0 | 86.53 | 92.93 |
| 2.5 | 88.70 | 94.75 |
| 3.0 | 90.33 | 95.98 |

It will be seen from the results of this model (Equation 1) that the size and distribution of void spaces within the filter media has a marked affect on the performance of the filter with respect to contaminant removal. If one assumes a Weibull distribution of void sizes with parameter 'a' of 20 and a parameter 'b' of 1.05, the kinetics of removal are shown in Table 1 and FIG. 1. In this figure we see that by shifting just the largest 10% of voids to the median value of the previous distribution by selectively collapsing some of the larger void spaces, we obtain a significant improvement in the amount of contaminant removed in a given time. Table 1 lists the percentage removal for the theoretical system at several time intervals. If the treatment objective is to reach 90% removal of a particular contaminant (as is required for certification by the NSF[2] for lead removal), the figure illustrates that this improvement may be dramatic in terms of ease of use of the filter. In this example the uncompressed media takes twice as long to reach compliance.

TABLE 2

The effects of compression on performance.

| | Contaminant Concentration ($\mu$g/mL) | |
| --- | --- | --- |
| Compression Level (%) | Influent | Effluent |
| 12 | 185 | 30 |
| 37 | 185 | 25 |
| 51 | 185 | 8 |

Laboratory analysis of media performance under various levels of compression were performed to validate the theoretical model, with these results presented in Table 2. A controlled volume vessel was packed with media compressed from 100% to around 50% of it's original thickness. Media which was midway through it's useful life was used for testing at exposure times of 3 minutes, in order to yield effluent concentrations which were detectable by anodic stripping voltametry. The performance of the media for lead removal was shown to increase dramatically with compression, moving from a low tested value of 84% removal at 12% compression to a maximum tested value of 96% at 50% compression.

The preferred manner of manufacture of coated nonwovens such as those which can be used in static filtration, are to draw rolls of a web (e.g. non-woven fabric) through a dipping bath where the materials the fabric is to be coated with are suspended. For purposes of the invention the bath contains water treatment materials exemplified by: activated carbon, ceramic cation-exchangers such as zeolites, amorphous gels such as sodium aluminosilicate or sodium titanium silicate, or polymers utilizing contaminant specific ligands; as well as a binder to secure them to the web, e.g. non-woven fabric. The fabric is generally pulled through the bath where the fabric becomes saturated with coating material, and then through a series of rollers which squeeze excess coating from the fabric for return to the dipping bath. As the coated fabric exits the rollers it is then pulled or pushed through a drying oven or other curing zone where the binder is allowed to cure. Tension is usually maintained at the leading and trailing ends of the fabric to ensure that the fabric moves through the process in a uniform manner, and other agents may be added to the coated fabric prior to drying in order to facilitate curing the binder.

The preferred substrate for the fabric is polyester, due to its wettability and stability. Since the filters are designed for use in treating potable water, a substrate which is listed under Title 21 of the Code of Federal Regulations, Section 177.2260 (21 CFR 177.2260) is appropriate. The adsorbent material used to coat the substrate is typically ground to a powder in order to facilitate the coating process and improved the kinetics of adsorption, but static treatment media can be produced using particles of essentially any size so long as the RDV/BV requirements are not violated. The polyester base is preferentially formed into a non-woven fabric prior to coating using the same FDA compliant binder which is used to coat the fabric. Also (a)–(c) may be practiced with a web speed between about 2 and 35 ft/min (or any other narrower range within that broad range).

According to one aspect of the invention there is provided a method of treating a web capable of water treatment having a first void size distribution, comprising: a) coating the web with a coating composition that facilitates treatment of water brought into contact therewith and includes a binder; b) substantially simultaneously with or after a), compressing the web in one dimension about 25–75%

(preferably 40–60%, e.g. 50%) so as to make the void size distribution substantially more uniform; and c) substantially maintaining the compression of the web from b) until the binder substantially cures so that the coated final web produced has a second void size distribution more uniform than the first void size distribution, and water treatment facility.

In the method c) may be practiced so as to produce a coated final web having void volumes with a mean value of about 6–7×10 to the minus 8th liters, and to produce a coated final web having an RDV/BV ratio of at least 0.4, and a porosity of greater than 90%. In one embodiment a) is practiced using a non-woven web having a weight of about 4–7 ounces/sq. ft., and applying a coating equal to about 100–200% of the uncoated weight of the fabric comprising about 10–20% binder, about 60–90% (e.g. 60–85%) activated carbon, and about 0–25% (e.g. 5–20%) zeolite.

In the method b) may be practiced by substantially immediately after a) passing the web through a series of staggered rollers. Alternatively, a compression of about 40–60% may be practiced by tightly winding the web prior to cure of the binder; or b) may be at least primarily (e.g. substantially exclusively) practiced by compressing the web in a curing tunnel, for example using upper and lower compression belt roller assemblies. In the method (a)–(c) may be practiced with a web speed of about 2–35 ft/min (and all narrower ranges within that broad range).

According to another aspect of the invention there is provided apparatus for producing a water treatment web, comprising: A feed roll of a web of material having a first void size distribution. A coating tank having a plurality of rollers therein through which the web from the feed roll passes, and applying a water treatment coating composition and binder to the web. A compression device which compresses the web (e.g. after exiting the coating tank) about 40–60% in a first dimension. A curing zone to allow at least partial curing of the web; and a take-up roll for taking up the final coated, compressed web.

The compression device may comprise a plurality of staggered rollers positioned substantially immediately after the coating tank; and the compression introduced by the compression device is preferably maintained substantially throughout the curing zone. Alternatively, the compression device and the curing zone comprise upper and lower compression belt roller assemblies in a curing tunnel, with squeeze rolls located above the coating tank and between the coating tank and curing tunnel for squeezing excess coating material from the web back into the coating tank. As another alternative the compression device primarily comprises the take-up roll, and wherein the take-up roll is positioned so as to take-up and compress the web after partial curing but prior to complete curing of the binder.

DETAILED DESCRIPTION OF THE DRAWINGS

Figure 1:
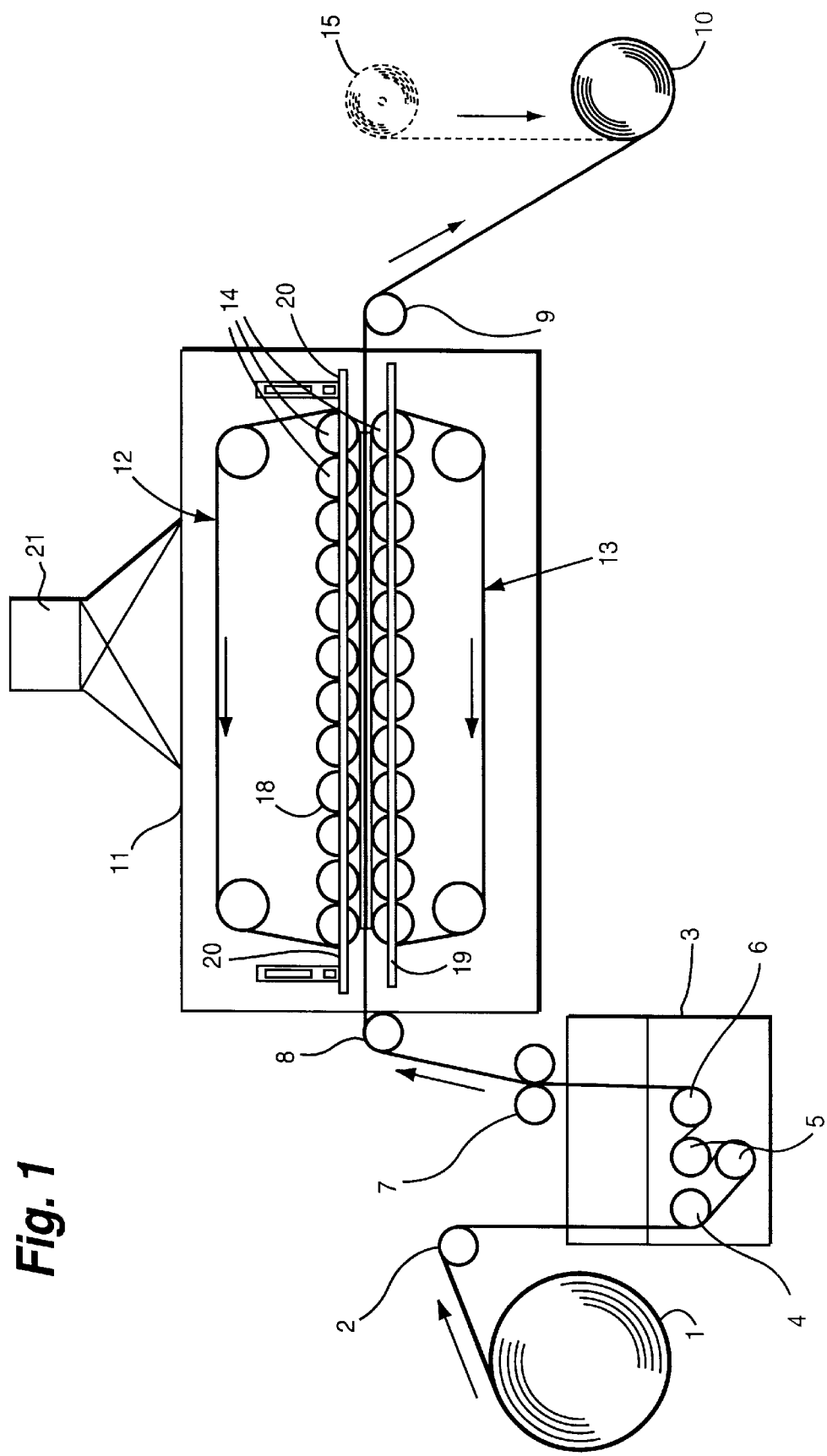
FIG. 1 is a side schematic view of one exemplary form of equipment for practicing an exemplary method according to the present invention.

FIG. 1 schematically illustrates an exemplary apparatus for use in producing a static filtration media for removing chlorine, lead, and perhaps other contaminants from water.

In the apparatus of FIG. 1 a roll of fabric, such as non-woven polyester fabric as described above, is taken off a core, such as by a powered roll 2, and fed into a coating tank 3, having a coating composition therein, such as the carbon-binder composition described above. In the tank 3, the fabric passes from positioning roll 4 to coating rolls 5 (being wrapped therearound in a substantially backwards extended S configuration), and then is guided by exit positioning roll 6 out of the tank 3 to the squeeze rolls 7. The rolls 7 above the tank 3 squeeze excess liquid coating composition out of the fabric back into the tank 3, so that the coated fabric has a coating that is about 100–200% by weight of the uncoated fabric.

From squeeze rolls 7 the now-coated fabric is moved by powered entry and tension roll 8 to the inlet of the curing tunnel 11, and is powered out of the tunnel 11 by the driven exit turning and tension roll 9, to be taken up by the receiving roll 10.

In the curing tunnel 11 the coated fabric is dried and cured, and is compressed so as to provide a more uniform void size distribution by selectively collapsing the largest voids. A typical optimum degree of compression is about 25–75%, preferably about 40–60% (e.g. about 50%), and so that the final substrate has an RDV/BV ratio of at least 0.4 and a porosity of greater than 90%.

The exemplary apparatus for effecting compression illustrated in FIG. 1 comprises upper 12 and lower 13 compression belt and roller assemblies each cooperating with a set of compression rolls 14. The belts 12, 13 even out the compressive force provided by the rolls 14. The axes of rotations of rolls 14 are mounted on the upper common support 18, while the axes of the lower rolls are mounted on a substantially fixed support 19. The desired compressive force is applied to the outwardly extending ears 20 of the top support 18, as seen in both FIGS. 1 and 2. [FIG. 2 is a top schematic of the inside of the curing tunnel 11.] The compressive force can be applied by hydraulic cylinders, or any other substantially precisely controllable force applicator.

Depending upon the coating composition, particularly the binder, the tunnel 11 may apply heat (above ambient temperature, sufficient to substantially dry and/or cure the coated web and binder without harming the coated web), or provide another controlled atmosphere, and any off-gases may exit through stack 21 and then be treated and discharged and/or reused.

After the now-final web of static filtration media exits the tunnel 11 the sheet feed roll 15 may provide a thin film of plastic, or like separating material, to the roll 10 to separate various spirals of the web from each other so that the web will not stick together during subsequent handling and shipping and storage. At some point in time the web from roll 10 is cut into sheets, which are used to fill a bottle, carafe, or other vessel to provide static filtration of the water therein.

Figure 2:
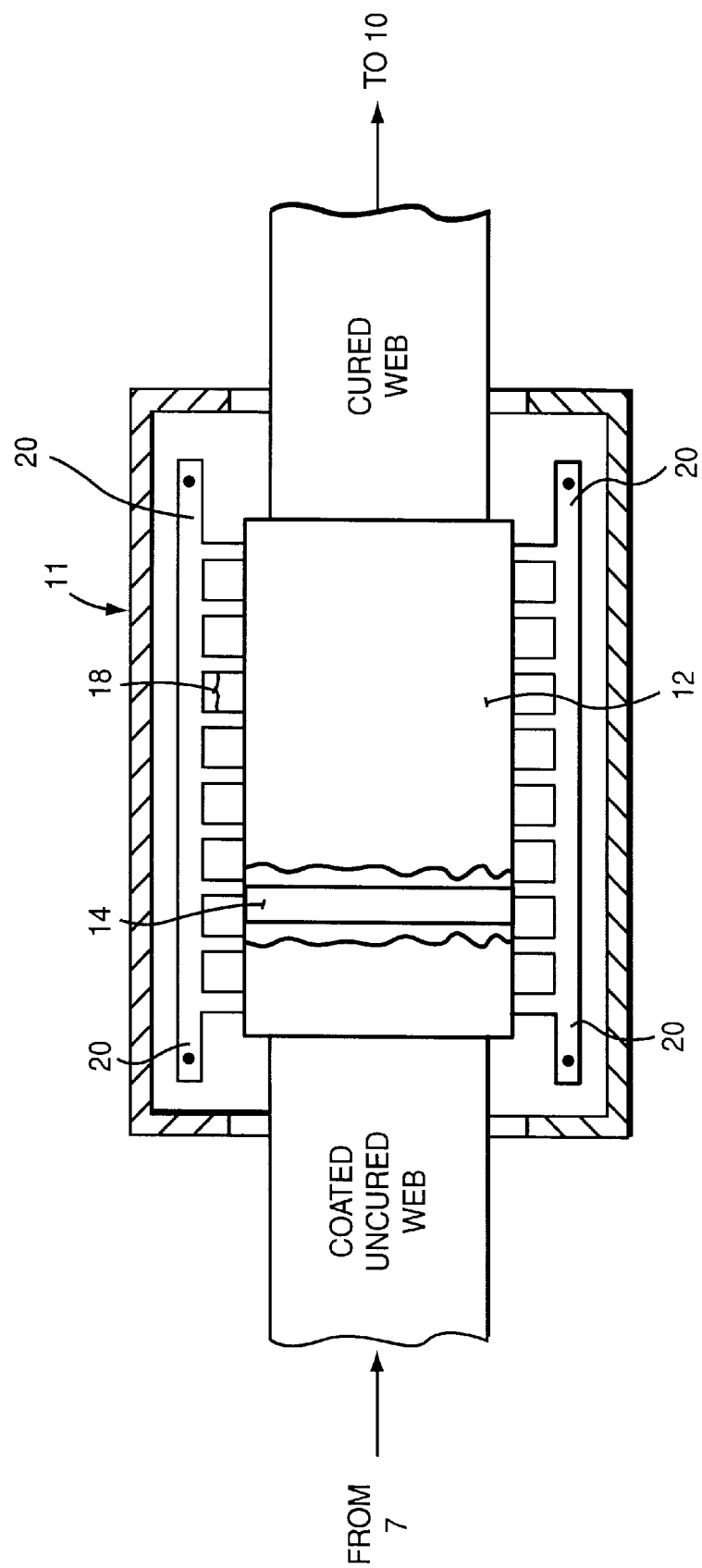
FIG. 2 is a top schematic of the inside of the curing tunnel of the equipment of FIG. 1.

In the practice of a method of producing static filtration media according to the invention using the apparatus of FIGS. 1 and 2, a media is produced having the hydraulic properties of the substantially planar surface different than those of the center of the media (fabric).

Figure 3:
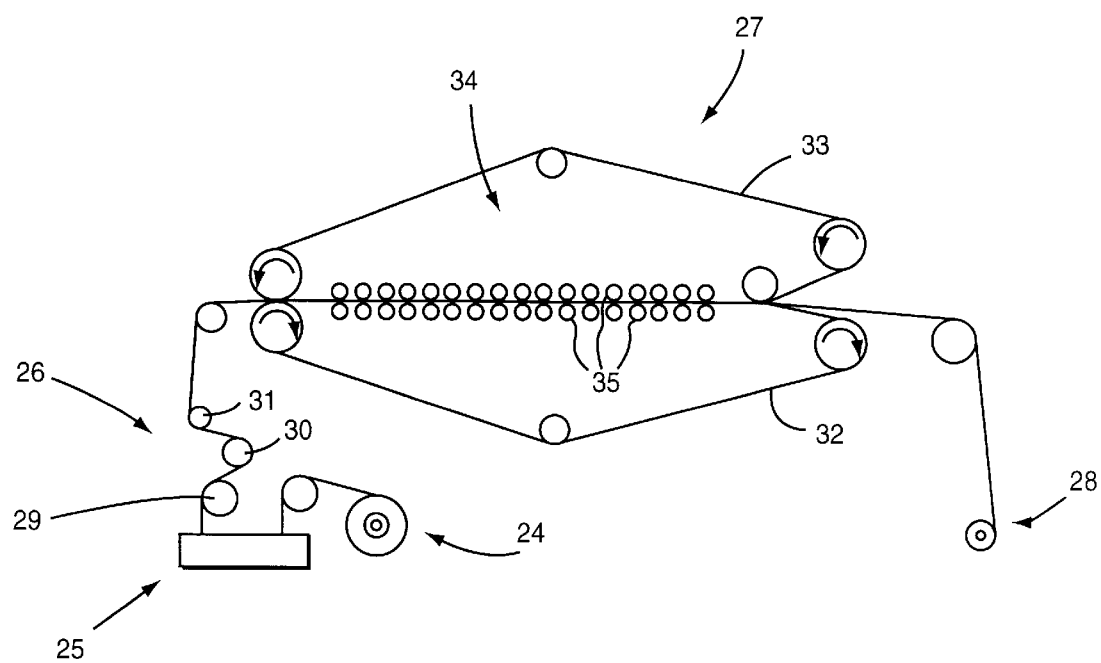
FIG. 3 is a view like that of FIG. 1 of another embodiment according to the invention.

FIG. 3 shows another exemplary embodiment of apparatus according to the invention including a feed roll 24, coating tank 25, compression device 26, which compresses the web about 40–60%, a curing zone 27, and a take-up roll 28. The compression device 26 comprises three or more staggered rollers 29, 30, 31, which serve not only to squeeze excess coating from the fabric, but also perform the aforementioned compression induced collapse of the largest void spaces to yield a product with vastly improved performance. Because of process indicated fracture and interlocking of non-woven fibers, the coated substrate does not fully recover its original loft following compression and curing. Normal coating operations thus maintain the preferential collapse of larger interstitial voids, with the effect being greatest at higher levels of compression.

Steps may be taken during manufacturing to ensure that the rolled media does not recover loft to any significant degree after release of compression. Curing the coating while under compression, allows tighter control of the void size distribution in the media. Examples of mechanisms which can be used to allow curing while under compression, include retaining the compressed fabric within the pair of porous belts 32, 33 in a belt filter press 34 (providing a secondary compression zone), as seen at 27 in FIG. 3. In FIG. 3 the coated media is first compressed in the primary compression zone 26 where the excess coating. is returned to the coating tank 25. The secondary compression and curing zone 27 comprises or consists of belt conveyor 34 which retains the media in compressed form while dried and cured. The belts 32, 33 employed preferably use an open web to allow the flow through of hot air to dry the fabric and facilitate curing.

In an alternative method, the upper and lower conveyor belts 32, 33 may be eliminated and with the coated fabric pulled through the compression zones through action of the receiving roll 28. In this method compression is applied less continuously than in the belt press operation, with some recovery of loft possible between the secondary compression rolls 35 of the press 34.

In a third method, the coated media is only partially cured prior to winding the nearly dry fabric around receiving cores (at take-up 28) for storage. By winding the fabric to a sufficient tension on the cores, an inwardly directed force vector compresses the fabric to the desired level. Storage of the wound cores under appropriate conditions allows additional curing of the binder to occur, thus reducing recovery of loft to a minimal level when the rolls are uncoiled.

While curing and/or drying the media under compression is not required to obtain the advantages of selective void collapse, in that the media may be compressed at the time the filter is assembled, tighter control of the void collapse minimizes water held by capillary forces.

To illustrate the value of selective void compression, consider two hypothetical media extremes, one with a large percentage of very small void spaces and one which predominate in large voids. Both media types fall within the description of the media in EP 0402661. In the first case the fluid would be held in close proximity to the sites of adsorption or reaction, facilitating rapid removal of contaminants from the water. The small volume voids would however experience capillary forces which would hold the water more tightly than in the larger voids, restricting the application to taller filters where a sizeable column of water may be needed to supply the gravitational force needed to overcome the wicking action when the device is poured. In filters with a predominance of smaller voids, the capacity of the device to deliver water is reduced, even if the void volume is large. Conversely, in media with a preponderance of larger voids deliverable capacity is great and fill and pour rates are high, but the kinetics of removal are slow.

In this disclosure all narrower ranges within a broad range are specifically disclosed. For example, an RDV/BV ratio of at least 0.4 means 0.5–0.6, 0.48–0.9, and all other narrower ranges within the broad range.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating a web capable of water treatment having a first void size distribution, comprising:
    a) coating the web with a coating composition that facilitates static treatment of water brought into contact therewith and includes a binder;
    b) substantially simultaneously with or after a), compressing the web in one dimension about 25–75% so as to make the void size distribution substantially more uniform; and
    c) substantially maintaining the compression of the web from b) until the binder substantially cures so that the coated final web produced has a second void size distribution more uniform than the first void size distribution, and water treatment function with an optimized relationship between adsorption kinetics and ease of fluid recovery.

2. A method as recited in claim 1 wherein a)–c) are practiced so as to produce a coated final web having void volumes with a mean value of about $6-7\times10$ to the minus $8^{th}$ liters.

3. A method as recited in claim 1 wherein a)–c) are practiced to produce a coated final web having an RDV/BV ratio of at least 0.4, and a porosity of greater than 90%.

4. A method as recited in claim 1 wherein b) is at least primarily practiced by substantially immediately after a) passing the web through a series of staggered rollers.

5. A method as recited in claim 4 wherein b) is practiced to effect a compression of about 40–60%.

6. A method as recited in claim 5 wherein a)–c) are practiced to produce a coated final web having an RDV/BV ratio of at least 0.4, and a porosity of greater than 90%.

7. A method as recited in claim 6 wherein a) is practiced using a non-woven web having a weight of about 4–7 ounces/sq. ft., and applying a coating equal to about 100–200% of the uncoated weight of the fabric comprising about 10–20% binder, about 60–85% activated carbon, and about 5–20% zeolite.

8. A method as recited in claim 1 wherein b) is at least primarily practiced by compressing the web while in a curing tunnel.

9. A method as recited in claim 8 wherein b) is practiced using upper and lower compression belt roller assemblies.

10. A method as recited in claim 9 wherein a)–c) are practiced to produce a coated final web having an RDV/BV ratio of at least 0.4, and a porosity of greater than 90%.

11. A method as recited in claim 10, wherein a) is practiced using a non-woven web having a weight of about 4–7 ounces/sq. ft., and applying a coating equal to about 100–200% of the uncoated weight of the fabric comprising about 10–20% binder, about 60–85% activated carbon, and about 5–20% zeolite.

12. A method as recited in claim 1 wherein a) is practiced using a non-woven web having a weight of about 4–7 ounces/sq. ft., and applying a coating equal to about 100–200% of the uncoated weight of the fabric comprising about 10–20% binder, about 60–90% activated carbon, and about 0–25% zeolite.

13. A method as recited in claim 1 wherein b) is primarily practiced by tightly winding the web prior to cure of the binder.

14. A method as recited in claim 13 wherein a)–c) are practiced to produce a coated final web having an RDV/BV ratio of at least 0.4, and a porosity of greater than 90%.

15. A method as recited in claim 14 wherein a) is practiced using a non-woven web having a weight of about 4–7 ounces/sq. ft., and applying a coating equal to about 100–200% of the uncoated weight of the fabric comprising about 10–20% binder, about 60–85% activated carbon, and about 5–20% zeolite.

16. A method as recited in claim 1 wherein (a)–(c) are practiced with a web speed between about 2 and 35 ft/min.

17. A method of processing a source roll of fabric into static filtration media via a processing apparatus including a plurality of rolls defining a roll path, a coating tank containing a coating composition that facilitates static treatment of water disposed in the roll path, and a curing tunnel surrounding the roll path, the method comprising:

(a) guiding the fabric from the source roll along the roll path via the plurality of rolls;

(b) coating the fabric with the static water treatment coating composition;

(c) squeezing excess coating composition from the coated fabric;

(d) processing the coated fabric in the curing tunnel such that the processed coated fabric has an optimized relationship between adsorption kinetics and ease of fluid recovery; and (e) winding the processed coated fabric into a finished roll.

18. A method according to claim 17, wherein step (c) is practiced by squeezing the coated fabric such that a coating thereon is about 100–200% by weight of the fabric in an uncoated state.

19. A method according to claim 17, wherein step (d) is practiced by compressing the coated fabric with a degree of compression between 24–75% and so that a final substrate has a RDV/BV ratio of at least 0.4 and a porosity of greater than 90%.

20. A method according to claim 17, wherein processing apparatus includes a coated fabric processing assembly having an upper compressing unit and a lower compressing unit in facing relation, wherein step (d) is practiced by urging the upper and lower compressing units together on opposite sides of the roll path.

21. A method according to claim 17, wherein step (d) is practiced by effecting an atmosphere in the curing tunnel.

22. A method according to claim 21, wherein the effecting step comprises applying heat to the coated fabric.

23. A method according to claim 17, further comprising, prior to step (e), the step of overlaying a separating material on the processed coated fabric.

* * * * *